3,463,675
MALLEABLE IRONS INCLUDING TELLURIUM
AND BISMUTH
Oral K. Hunsaker and Bruce R. Shue, Dayton, and Ralph
C. Davis, Ironton, Ohio, assignors to The Dayton
Malleable Iron Company, Dayton, Ohio, a corporation
of Ohio
No Drawing. Filed Dec. 30, 1966, Ser. No. 605,955
Int. Cl. C21d 7/14; B22d 25/00
U.S. Cl. 148—3                                 9 Claims

ABSTRACT OF THE DISCLOSURE

A method for making standard and pearlitic and malleable iron, and the resulting product, in which tellurium and bismuth are simultaneously added as a pellet to provide between 0.001% and 0.003% and 0.001% and 0.009% residuals of tellurium and bismuth, respectively.

---

This invention relates to malleable irons including tellurium and bismuth and to the method of producing the same.

Malleable iron includes two principal types, standard or ferritic malleable which includes ferrite in which is interspersed nodules of free carbon, and pearlitic malleable in which some of the carbon is present in combined form. The production of malleable iron is a direct process in which scrap, foundry returns including sprue (gates and feeders from previous heats) and the like are the raw materials. Melting is carried out in a cupola, air or induction furnace or in combinations, for example, a "duplexing" system. Metallurgical inspection is closely controlled during melting with suitable additions as needed to provide the proper chemical composition of the white iron. Following the melting operation, the white iron castings are poured and heat treated for malleabilization, the heat treatment or annealing being variable depending upon whether ferritic or pearlitic malleable iron is the final product.

As cast white iron of malleable composition will solidify with the carbon which is present in the material being in the form of cementite or iron carbide, and when at room temperature, will consist of rather large carbides and pearlite, that is, alternate layers of ferrite and cementite. The malleabilization procedure converts the combined carbon into elemental carbon, that is, graphite or temper carbon and ferrite. In first-stage malleabilization or graphitization, the white iron castings are heated through the eutectoid range to transform the pearlite into austenite in which carbon from the cementite diffuses into the iron to form a solid solution of carbon and gamma iron.

The first-stage graphitization includes several processes which are carried out simultaneously including solution of the cementite at its interface with austenite, dissolution or dissassociation of cementite into iron and carbon, migration of carbon through the austenite or diffusion of matrix atoms away from the nuclei from which the temper carbon grows, and precipitation of graphite. After first stage graphitization, the structure of the casting consists of graphite, also referred to as temper carbon nodules, which are distributed through the austenite matrix, the latter being a solid solution of gamma iron saturated with an amount of carbon which is dependent upon the particular temperature of the first-stage malleabilization procedure. Usually the first-stage malleabilization is carried out at a temperature of between 1600° and 1800° F.

The second stage consists of reducing the temperature of the iron into the eutectoid range wherein the iron exists in three phases, austenite-ferrite-cementite, or austenite-ferrite-graphite. The first phase is considered metastable while the second is considered a stable phase. At a temperature slightly below the eutectoid range, any pearlite in the iron will graphitize. By slow passage through the eutectoid range, the iron is fully graphitized or malleabilized and no further structural change takes place at the lower temperatures. The product of full malleabilization is ferritic malleable iron which is substantially free of pearlite structure.

The objective in the formation of pearlitic malleable is to treat the product of the first-stage graphitization in such a manner that the eutectoidal carbides and low-temperature transformation products are purposely retained. Various procedures have been used commercially in the formation of pearlitic malleable iron including first-stage graphitization, air quench, and temper; or followed by the additional steps of reheating into the austenitic range, oil quench and temper, or ferritic malleabilization (ferrite and free carbon) followed by reheating into the austenitic range, oil quench and temper. Recently, several malleable iron foundries have used a continuous procedure which includes first-stage graphitization, cooling, oil quench and tempering. The matrix may vary, for example, it may be lamellar pearlite, spheroidite, martensite, tempered martensite, fine spheroidite, coarse lamellar pearlite or bainite.

The metallurgy of malleable iron depends on maintaining a closely controlled equilibrium between those elements (graphitizers) which tend to form a stable system which includes primary or flake graphite, and elements (retardants) which prevent or retard decomposition of the cementite. The tendency to form primary graphite, or mottling, is so controlled by balancing the relative amounts of graphitizers and retardants as to promote the formation of a metastable system enabling the necessary metallurgical transitions to form malleable iron from white iron. If the graphitizer is present in an amount sufficient to produce primary graphite, the result is gray iron rather than malleable iron.

It is known that silicon is a graphitizer, and a particularly strong graphitizer at comparatively high levels of carbon. On the other hand, tellurium and bismuth are strong retardants and it has been known to use them separately, see U.S. Patents 2,331,886 and 2,370,225, respectively. It is also known to use bismuth in combination with boron, and to use tellurium in combination with boron, see U.S. Patents 2,579,452 and 2,450,395, respectively.

As between tellurium and bismuth, the former is a far stronger retardant than the latter, however, the density of tellurium is less than that of the base iron composition to which it is added so that it tends to float on the slag and reacts primarily with the slag. Also, the boiling point of tellurium is sufficiently low so that when introduced into molten base iron it tends to vaporize quickly unless some method and means is provided for getting it through the slag and into the metal. Bismuth, on the other hand, has a somewhat higher density than the base iron so that it is assimilated into the charge but is not nearly as reactive as tellurium. While currently less expensive per pound, more bismuth is needed and thus the overall cost is greater than if tellurium were used to bring about a comparable effect.

It has been observed in accordance with the present invention that the addition of tellurium alone as a retardant, although far more reactive than bismuth, leads to irregular and nonpredictable results. Similraly, the addition of bismuth alone likewise produces irregular results possibly because of its relative inactivity as compared to tellurium. In view of the fact that the transition from white iron to malleable iron depends upon the establishment of a metastable system, even a small excess amount of a retardant will transform the metastable system to a stable system which prevents annealing of the white iron to form malleable iron and conversely, insufficient amounts of retardants have a marked effect on nodule shape and count.

In accordance with the present invention, repeatability and predictability are achieved in the use of tellurium by the simultaneous addition to the base iron of both tellurium and bismuth as a unit. It has been observed in accordance with the present invention that through the simultaneous addition of both of these elements, a synergistic effect results, although the cause of the synergism is not completely understood. Since tellurium is ten to twenty times more effective as a retardant than bismuth, it would be expected that the simultaneous addition of tellurium with a small amount of bismuth would not produce an effect which differed substantially from the use of tellurium alone. It has been observed in accordance with the present invention that the simultaneous addition of tellurium and bismuth is far more effective than the addition of an equal amount of tellurium alone or bismuth alone. Also, excess amounts of bismuth beyond the limits later defined do not appreciably alter the annealing process, but even small excess of tellurium result in formation of carbides which cannot be decomposed on annealing because of the high efficiency of tellurium as a retardant. These materials also have been observed to provide different results as additives.

Bismuth alone does not markedly affect the nodule count or shape within the limits of the metallurgical composition here described, while tellurium, on the other hand, operates to decrease the nodule count while compacting the nodule. Equally important is the fact that simultaneous addition of these retardants usually does not require any substantial changes in the annealing cycles. This latter factor is of considerable importance because, as a practical matter, most foundries operate on a continuous basis using fixed annealing cycles. It is far easier to adjust the metallurgical compositions of the base iron rather than to make changes in the annealing schedule.

Accordingly, it is a primary object of the present invention to provide an improved method for producing white iron castings including both tellurium and bismuth in amounts sufficient to provide a metastable system thereby enabling the transition from white iron to malleable iron upon annealing.

Another object of the present invention is the provision of the method for preventing primary flake graphite formation in a base iron metal by the simultaneous addition thereto of pellets of tellurium and bismuth.

Another object of the present invention is the provision of an improved white iron composition including tellurium and bismuth of improved physical properties.

Other objects and advantages of the invention will be apparent from the following description and the appended claims.

In accordance with the present invention, relatively small amounts of tellurium and bismuth are simultaneously added to a base iron mixture which includes between 2.40% to 3% carbon, between 1.5% to 2.3% silicon, the remainder of the mixture being iron and trace impurities. Phosphorus is present in the mixture, but not more than 0.10% and preferably less than 0.055% so that the nil ductility transition temperature is maintained relatively low. Tellurium is present in the range of 0.001% and 0.003% while bismuth is present in the range of between 0.001% and 0.009%. When tellurium is present in an amount of between .0015% and .0025%, the silicon content is maintained in the range of 1.6% to 1.7%; and when present in an amount between .0025% and .0030%, the silicon content is maintained between 1.7% and 1.85%. The carbon equivalent that is, total carbon in percentage plus one-third the combined percentage of silicon and phosphorus, is maintained between 2.99 and 3.5.

By using both tellurium and bismuth in the amounts indicated, it is possible to increase the silicon content to values somewhat higher than normally used with the advantage of improved physical properties and which provides a metal which is more fluid, thereby enabling easier casting and at the same time permitting annealing using standard cycles.

The tellurium and bismuth are added simultaneously by forming a pellet of the two metals, and the pellet including between 30 and 60 grams of bismuth and 4 grams of tellurium. The pellet may take various forms, for example, suitable amounts of each of the metals may be bonded together by the use of a silicate binder or an adhesive of epoxy resin (reaction product of epichlorohydrin and bisphenol A) or carnauba wax. It is possible in accordance with the present invention to pour both metals together to form a pellet without the use of an adhesive. By combining the proper amount of tellurium and bismuth in a single pellet, introduction of the tellurium and bismuth additives into the metal is assured since the density of the pellet of both tellurium and bismuth is higher than that of the metal to which it is added and sufficiently high to penetrate the slag and to carry into the molten metal. The pellet may also be made up of 5 grams bismuth and 4 grams of tellurium.

It is preferred in accordance with the present invention that the additions be made in the ladle, although it is also possible to introduce pellets into the cupola during the melting process. In the case of duplexing, the pellets may be added in either the air furnace or the electric furnace depending upon which is used.

In usual foundry practice, the process is continuous including the sequential operations of melting a heat, pouring it, shake-out of the castings, separation of gate, risers sprues and castings, annealing the castings and return of sprues, gates and risers and reject castings for use in subsequent heats. In a typical foundry procedure, the sprues, etc. may be returned as many as five times a day. Thus, the chemical composition of the sprue and reject castings have a pronounced effect on the composition of the heat especially since the sprues, etc. usually constitute 50% of the raw material for the heat.

In accordance with the present invention, the use of tellurium and bismuth is accomplished in stages as follows: initially the heat contains relatively small percentage of residual amounts of tellurium and bismuth. To bring the amount of tellurium and bismuth up to the amount prescribed in accordance with the present invention, the initial addition of tellurium and bismuth is comparatively high. After the heat is poured, and the sprues from that heat are collected for use in a second heat, the residual amounts of tellurium and bismuth are increased substantially because of the amounts of these metals present in the sprues. Accordingly, the additions made in the second heat are considerably less than that in the first heat since it is necessary to compensate for the increased residuals of tellurium and bismuth attributable to the use of sprues of comparatively high bismuth and tellurium content. The pellets previously described as containing between 30 and 60 grams of bismuth and 4 grams of tellurium are formulated for use on the basis that the sprues added to the heat also contain tellurium and bismuth above the normal amount.

Once an equilibrium condition has been established wherein the amount of tellurium and bismuth added through sprue addition is at a fixed relative percentage, tellurium and bismuth pellets, as above described, may be added to ladles of 1200 to 2000 pound capacity and in an amount sufficient to provide residual or tellurium and bismuth in an amount between 0.001% and 0.003%, and between 0.001% and 0.009%, respectively.

The effect of the separate addition of bismuth is shown in the following table:

TABLE I

| Heat: | Si | Mn | C | S | Cr | P | Al | B | Te | Bi | Sb |
|---|---|---|---|---|---|---|---|---|---|---|---|
| 1 | 1.62 | 0.36 | 2.70 | | .042 | .050 | .0077 | .0029 | .0009 | .0080 | .0047 |
| 2 | 1.51 | .35 | 2.50 | | .049 | .050 | .0077 | .0035 | .0011 | .0083 | .0053 |
| 3 | 1.46 | .43 | 2.63 | | .046 | .048 | .0070 | .0036 | .0009 | .0051 | .0030 |
| 4 | 1.50 | .40 | 2.51 | | .044 | .051 | .0077 | .0028 | .0009 | .0063 | .0039 |
| 5 | 1.61 | .42 | 2.60 | | .051 | .050 | .0090 | .0033 | .0009 | .0013 | .0022 |
| 6 | 1.40 | .36 | 2.51 | | .044 | .048 | .0062 | .0021 | .0009 | .0040 | .0039 |
| 7 | 1.65 | .36 | 2.69 | | .054 | .051 | .0084 | .0029 | .0009 | .0053 | .0042 |
| 8 | 1.56 | .36 | 2.60 | | .051 | .049 | .0081 | .0042 | .0009 | .0075 | .0037 |
| 9 | 1.61 | .38 | 2.61 | | .039 | .049 | .0070 | .0031 | .0010 | .0076 | .0036 |
| 10 | 1.58 | .38 | 2.60 | | .039 | .050 | .0068 | .0053 | .0013 | .0072 | .0040 |
| 11 | 1.60 | .36 | 2.52 | | .047 | .050 | .0075 | .0026 | .0009 | .0061 | .0045 |
| 12 | 1.58 | .35 | 2.68 | | .047 | .048 | .0068 | .0022 | .0010 | .0077 | .0039 |
| 13 | 1.39 | .34 | 2.48 | | .049 | .048 | .0060 | .0025 | .0010 | .0076 | .0038 |
| 14 | 1.43 | .36 | 2.63 | | .047 | .048 | .0075 | .0060 | .0013 | .0071 | .0036 |
| 15 | 1.60 | .35 | 2.67 | | .043 | .042 | .0088 | .0022 | .0011 | .0056 | .0030 |
| 16 | 1.58 | .36 | 2.48 | | .040 | .038 | .0068 | .0024 | .0011 | .0054 | .0040 |
| 17 | 1.57 | .39 | 2.56 | | .040 | | .0074 | .0076 | .0009 | .0043 | .0038 |
| 18 | 1.61 | .33 | 2.52 | | .036 | | .0095 | .0078 | .0010 | .0068 | .0045 |
| 19 | 1.58 | .35 | 2.60 | | .040 | .038 | .0063 | .0023 | .0012 | .0075 | .0044 |
| 20 | 1.65 | .31 | 2.86 | | .054 | .039 | .0075 | .0029 | .0009 | .0047 | .0046 |
| 21 | 1.54 | .39 | 2.58 | | .051 | .029 | .0072 | .0037 | .0009 | .0066 | .0046 |
| 22 | 1.55 | .31 | 2.55 | .115 | .049 | .034 | .0059 | .0026 | .0010 | .0092 | .0037 |
| 23 | 1.58 | .46 | 2.57 | | .056 | .035 | .0069 | .0024 | .0013 | .0072 | .0047 |

In each of the heats of Table I, about 50% of the heat was composed of reject castings and sprue of the previous heat. Bismuth was added at the rate of between 0.01% and 0.03% in an attempt to achieve a proper balance of retained bismuth. As indicated in these data, the residuals of bismuth varied appreciably, e.g., from .0083 in heat 2 to .0013 in heat 5.

In a subsequent series of heats, tellurium and bismuth were added but not as a unit, i.e., a pellet of both metals. The data appear in the following table:

TABLE II

| Heat: | Si | Mn | C | Cr | P | S | Al | B | Te | Bi | Sb |
|---|---|---|---|---|---|---|---|---|---|---|---|
| 24 | 1.65 | .35 | 2.65 | .050 | .032 | | .0081 | .0035 | .0015 | .0020 | .0042 |
| 25 | 1.60 | .34 | 2.55 | .047 | .033 | | .0081 | .0018 | .0017 | .0038 | .0037 |
| 26 | 1.57 | .38 | 2.54 | .058 | | .123 | .0081 | .0029 | .0014 | .0050 | .0036 |
| 27 | 1.51 | .35 | 2.70 | .056 | | | .0068 | .0023 | .0016 | .0071 | .0053 |
| 28 | 1.62 | .38 | 2.52 | .054 | .030 | | .0074 | .0028 | .0014 | .0075 | .0047 |
| 29 | 1.55 | .34 | 2.67 | .050 | .036 | | .0074 | .0019 | .0019 | .0066 | .0041 |

These data are also significant in the variation in residual bismuth, e.g., a high of .0075% in heat 28 and a low of .0020% in heat 24. The percentage of residual tellurium in heats 24–29 has increased over that of heats 1–23 but the wide variation in bismuth was not eliminated.

Thereafter, it was attempted to increase the amount of tellurium residuals with a view towards eliminating the bismuth addition in the hope that a stable predictable level of bismuth and tellurium would be achieved. The data are presented in the following table:

TABLE III

| Heat: | Si | Mn | C | Cr | P | S | Al | B | Te | Bi | Sb |
|---|---|---|---|---|---|---|---|---|---|---|---|
| 30 | 1.58 | .34 | 2.49 | .060 | | | .0075 | .0025 | .0043 | .0013 | .0039 |
| 31 | 1.48 | .33 | 2.66 | .054 | | | .0067 | .0028 | .0036 | .0011 | .0031 |
| 32 | 1.63 | .36 | 2.51 | .047 | | | .0074 | .0030 | .0037 | .0011 | .0044 |
| 33 | 1.62 | .37 | 2.52 | .043 | | | .0074 | .0036 | .0043 | .0010 | .0030 |
| 34 | 1.72 | .37 | 2.55 | .048 | | | .0055 | .0030 | .0055 | .0012 | .0048 |
| 35 | 1.63 | .38 | 2.57 | .050 | | | .0078 | .0027 | .0030 | .0016 | .0044 |
| 36 | 1.62 | .37 | 2.50 | .040 | .036 | | .0073 | .0039 | .0018 | .0009 | .0042 |
| 37 | 1.66 | .40 | 2.52 | .048 | | | .0087 | .0039 | .0029 | .0009 | .0043 |
| 38 | 1.71 | .40 | 2.53 | .050 | | | .0082 | .0058 | .0037 | .0009 | .0038 |

Of significance in the data of Table III is the wide variation in retained residuals of tellurium, the low being .0018% in heat 36 and the high being .0055% in heat 34. Also, it was observed that the metal of heats 30 to 38 included hard carbides which rendered the iron quite difficult to machine.

Thereafter, both bismuth and tellurium were added together, as a unit by forming both metals into a pellet by any of the means previously described. The data are presented in Table IV.

TABLE IV

| Heat: | Si | Mn | C | Cr | P | S | Al | B | Te | Bi | Sb |
|---|---|---|---|---|---|---|---|---|---|---|---|
| 39 | 1.72 | .39 | 2.64 | .047 | .036 | | .009 | .0045 | .0022 | .0045 | .0027 |
| 40 | 1.69 | .43 | 2.51 | .047 | .034 | | .0067 | .0034 | .0012 | .0043 | .0031 |
| 41 | 1.68 | .40 | 2.65 | .048 | | | .0069 | .0028 | .0015 | .0033 | .0030 |
| 42 | 1.68 | | 2.42 | .050 | .037 | | .0064 | .0028 | .0017 | .0054 | .0033 |
| 43 | 1.78 | .43 | 2.56 | .049 | .035 | | .0073 | .0018 | .0014 | .0050 | .0026 |
| 44 | 1.68 | .41 | 2.70 | .056 | | | .0076 | .0019 | .0011 | .0058 | .0031 |
| 45 | 1.64 | .37 | 2.55 | .048 | .036 | | .0074 | .0017 | .0010 | .0046 | .0027 |
| 46 | 1.82 | .40 | 2.65 | .051 | .035 | | .0054 | .0022 | .0011 | .0054 | .0030 |
| 47 | 1.82 | .41 | 2.59 | .050 | | | .0074 | .0022 | .0017 | .0049 | .0029 |
| 48 | 1.88 | .38 | 2.67 | .048 | .037 | | .0080 | .0021 | .0021 | .0063 | .0020 |
| 49 | 1.59 | .35 | 2.50 | .050 | | | .0071 | .0025 | .0012 | .0062 | .0026 |
| 50 | 1.60 | .38 | 2.63 | .048 | .036 | | .0080 | .0025 | .0015 | .0050 | .0021 |
| 51 | 1.78 | .36 | 2.56 | .047 | .034 | | .0074 | .0025 | .0022 | .0043 | .0027 |
| 52 | 1.56 | .34 | 2.58 | .037 | .030 | | .0074 | .0022 | .0016 | .0040 | .0030 |
| 53 | 1.67 | .33 | 2.53 | .041 | | | .0071 | .0022 | .0025 | .0043 | |
| 54 | 1.73 | .35 | 2.49 | .046 | | | .0062 | .0022 | .0019 | .0043 | .0026 |
| 55 | 1.66 | .36 | 2.59 | .044 | .031 | | .0071 | .0024 | .0015 | .0057 | .0026 |
| 56 | 1.65 | .35 | 2.54 | .044 | | | .0063 | .0020 | .0020 | .0043 | .0027 |
| 57 | 1.64 | .36 | 2.62 | .044 | | | .0071 | .0020 | .0022 | .0044 | .0030 |
| 58 | 1.88 | .36 | 2.53 | .040 | .032 | | .0079 | .0025 | .0018 | .0045 | |
| 59 | 1.60 | .42 | 2.55 | .043 | .033 | | .0086 | .0025 | .0017 | .0043 | .0027 |
| 60 | 1.69 | .34 | 2.57 | .043 | .031 | | .0071 | .0034 | .0016 | .0043 | .0028 |
| 61 | 1.84 | .39 | 2.57 | .042 | .033 | | .0076 | .0033 | .0009 | .0052 | .0024 |
| 62 | 1.66 | .40 | 2.55 | .047 | | | .0071 | .0020 | .0015 | .0034 | .0029 |
| 63 | 1.55 | .41 | 2.52 | .047 | .033 | | .0064 | .0022 | .0013 | .0043 | .0023 |
| 64 | 1.57 | .38 | 2.51 | .044 | | | .0075 | .0021 | .0011 | .0029 | .0022 |
| 65 | 1.56 | .40 | 2.52 | .045 | .033 | | .0063 | .0023 | .0011 | .0023 | .0020 |
| 66 | 1.70 | .40 | 2.63 | .037 | | | .0081 | .0032 | .0011 | .0032 | .0021 |
| 67 | 1.66 | .35 | 2.58 | .037 | .031 | | .0074 | .0021 | .0013 | .0044 | .0025 |
| 68 | 1.66 | .36 | 2.51 | .042 | .033 | | | | .0016 | .0046 | |

The data of Table IV shows the relatively close control of both bismuth and tellurium which may be obtained by a simultaneous addition of both metals as a pellet. In all of the above data of Tables I–IV, the same relative amounts of bismuth and tellurium were added at essentially the same point in the process, and each heat was formed of between 45 to 55% of sprues and reject castings of the previous heats. In comparing the low and high ranges of bismuth and tellurium, it will be noted that the range of bismuth is narrowest for the Table IV data (heat 65 and heat 48) compared to Table I (heat 5 and heat 22) and Table II (heat 24 and heat 28). Since no bismuth was added to any of the heats of Table III, the percentage of bismuth is relatively low.

In the case of tellurium, the low and high range of Table IV (heat 61 and heat 53) is narrower than the range of Table III (heat 36 and heat 34) and wider than the range of Table II (heat 28 and heat 29). The limiting fact of the low and high in Table II is the amount of silicon that can be tolerated, that is, if silicon is present above about 1.7%, it is preferred that the amount of tellurium be on the high side of the range.

The primary advantage of the simultaneous addition of tellurium and bismuth as a single pellet is that the metallurgical control of the base iron is possible within ranges which permit continuous annealing without changes in the annealing cycle. This is especially the case with base irons of comparatively high silicon contents, e.g., 1.7% to 1.90%. The typical annealing cycles are comparatively fast and range from 12 to 24 hours in the oven during which the castings are elevated in temperature through the eutectoid range (1700° F. to 1800° F.) in about five to six hours and held at that temperature for a period of time (2 to 4 hours) sufficient to effect graphitization (first stage) of the carbides. The castings are then cooled (second stage) while in the oven to a temperature below the above temperature in the range of 1200° F. to 1650° F. for controlling combined carbon, and optionally reheating to a third temperature, above the second in the range of 1400° F. to 1650° F. and quench for formation of pearlitic malleable. Following the annealing, the castings may be liquid or air quenched and thereafter tempered.

Another cycle which has been used includes heating the castings to 1300° F. to 1675° F. at a rate of 200° F./hr. then increasing the temperature to 1750° over a period of seven hours and holding at that temperature for four hours. The temperature is then reduced at a rate of 130° F. per hour to about 1200° F. and held at that temperature for about one hour followed by raising the temperature at 200° F./hr. to 1650° F., followed by quenching. During the annealing cycles, the castings are heated in an inert atmosphere.

With the relatively small range of tellurium and the balanced amount of silicon as herein specified, it is possible to anneal the castings rather quickly while controlling the nodule count and shape. In other words, it is because of the balance between graphitization and retardants in the base iron that acceptable nodule counts are obtained within the relatively fast annealing cycles above described.

In addition to the advantages previously noted, it was also observed that standard malleable iron produced in accordance with the present invention exhibited improved physical properties. For example, ASTM grade 32510 standard malleable of the following analysis: C, 2.3–2.65%; Si, 1.40–0.90%; Mn, 0.25–0.55%.

P less than 0.18% possessed the following physical properties:

Minimum tensile (p.s.i.) _____ 50,000
Minimum yield (p.s.i.) _____ 32,500
Minimum elongation percent in 2″ _____ 10

ASTM grade 35018 of the following analysis: C, 2.00–2.45%; Si, 1.25–0.95%; Mn, .25–0.55%.

P less than 0.18% possessed the following physical properties:

Minimum tensile (p.s.i.) _____ 53,000
Minimum yield (p.s.i.) _____ 35,000
Minimum elongation percent in 2″ _____ 18

In the heats reported in Table V, all heats included between 0.001% and 0.003% tellurium and between 0.001% and 0.009% bismuth, added as previously described.

TABLE V

| Heat: | Si | Mn | C | S | Tensile | Yield | Elongation |
|---|---|---|---|---|---|---|---|
| 69–1 | 1.70 | 0.42 | 2.61 | .122 | 54,300 | 35,600 | 19.0 |
| 69–2 | 1.70 | 0.42 | 2.61 | .122 | 56,500 | 36,600 | 21.0 |
| 69–3 | 1.70 | 0.42 | 2.61 | .122 | 55,850 | 36,300 | 23.5 |
| 69–4 | 1.70 | 0.42 | 2.61 | .122 | 56,200 | 36,600 | 20.5 |
| 69–5 | 1.70 | 0.42 | 2.61 | .122 | 56,200 | 36,600 | 16.5 |
| 69–6 | 1.70 | 0.42 | 2.61 | .122 | 55,500 | 36,300 | 21.0 |
| 69–7 | 1.70 | 0.42 | 2.61 | .122 | 56,200 | 36,600 | 19.0 |
| 69–8 | 1.70 | 0.42 | 2.61 | .122 | 55,500 | 36,300 | 21.5 |
| 70–1 | 1.55 | .38 | 2.75 | .120 | 51,550 | 33,400 | 18.0 |
| 70–2 | 1.55 | .38 | 2.75 | .120 | 50,850 | 33,100 | 18.5 |
| 70–3 | 1.55 | .38 | 2.75 | .120 | 50,560 | 33,400 | 18.5 |
| 70–4 | 1.55 | .38 | 2.75 | .120 | 51,150 | 33,400 | 18.5 |
| 70–5 | 1.55 | .38 | 2.75 | .120 | 50,150 | 33,800 | 18.5 |
| 70–6 | 1.55 | .38 | 2.65 | .120 | 51,450 | 35,000 | 16.0 |
| 70–7 | 1.55 | .38 | 2.75 | .120 | 50,850 | 34,160 | 19.0 |
| 70–8 | 1.55 | .38 | 2.75 | .120 | 51,150 | 34,160 | 17.5 |

One of the features of the present invention is the ability to increase the amount of silicon used in the base iron over that usually present in malleable iron. Normally the addition of silicon over that normally used results in mottled iron, yet when the silicon content is increased in accordance with this invention wherein tellurium and bismuth are present in the amounts indicated, not only does the iron fracture white, but there is some improvement in physical properties. An added benefit is that the molten metal is more fluid with the higher silicon content, and thus it is easier to pour castings.

Table VI sets out data indicating the effect of increasing silicon content with respect to physical properties:

TABLE VI

| Heat | Si | Mn | C | S | Cr | Tensile | Yield | Elongation |
|---|---|---|---|---|---|---|---|---|
| 71 | 1.77 | .40 | 2.76 | .118 | .052 | 52,400 | 36,300 | 16.5 |
| 72 | 2.12 | .40 | 2.76 | .118 | .052 | 53,350 | 36,900 | 12.5 |
| 73 | 1.59 | .40 | 2.60 | .118 | .047 | 52,050 | 35,300 | 19.0 |
| 74 | 2.10 | .40 | 2.60 | .118 | .047 | 55,500 | 38,200 | 17.0 |
| 75 | 1.58 | .36 | 2.57 | .131 | .050 | 50,500 | 34,100 | 16.0 |
| 76 | 2.03 | .36 | 2.57 | .131 | .050 | 54,300 | 40,000 | 14.0 |
| 77 | 1.77 | .40 | 2.62 | .118 | .047 | 53,700 | 35,300 | 18.5 |
| 78 | 2.35 | .40 | 2.62 | .118 | .047 | 54,300 | 42,900 | 10.0 |
| 79 | 1.75 | .35 | 2.51 | .112 | .048 | 53,000 | 35,300 | 20.0 |
| 80 | 2.32 | .35 | 2.51 | .112 | .048 | 56,200 | 41,650 | 14.0 |
| 81 | 1.57 | .34 | 2.60 | .113 | .048 | 52,400 | 36,000 | 19.0 |
| 82 | 2.15 | .34 | 2.60 | .113 | .048 | 57,400 | 39,100 | 18.0 |
| 83 | 1.52 | .35 | 2.43 | .126 | .044 | 52,400 | 36,000 | 19.5 |
| 84 | 2.17 | .35 | 2.43 | .126 | .044 | 57,700 | 38,200 | 18.0 |
| 85 | 1.63 | .32 | 2.55 | .114 | .044 | 53,700 | 36,000 | 17.5 |
| 86 | 1.97 | .32 | 2.55 | .114 | .044 | 55,850 | 39,400 | 18.5 |

In heats 71–86 of Table VI, the tellurium and bismuth content was within the ranges previously described in accordance with the present invention.

In the case of pearlitic type malleable, i.e., grade 80002, the present invention also provides improved physical properties. The average values for grade 80002 are as follows:

Yield (p.s.i.) _____ 80,000
Ultimate tensile (p.s.i.) _____ 100,000
Elongation (percent) _____ 2

The same grade pearlitic malleable iron having residual amounts of tellurium and bismuth described in accordance with the present invention exhibited the following physical properties:

Yield _____ 95,000
Ultimate tensile _____ 120,000
Elongation (percent) _____ 6–7

The nodule count of the malleable irons in accordance with this invention range from 80 to 200 temper carbon nodules per square millimeter, with preferred ranges from 100 to 150 nodules/sq. mm. Tellurium in amounts appreciably greater than here specified shows a tendency to reduce the nodule count.

While the method and product herein described constitutes a preferred embodiment of the invention, it is to be understood that the invention is not limited to this precise method and product, and that changes may be made therein without departing from the scope of the invention.

What is claimed is:

1. The method of forming malleable irons comprising the steps of forming a molten base iron mixture comprising as essential ingredients between 2.40% and 3% of carbon, between 1.5% to 2.35% silicon, not more than 0.15% phosphorus, the remainder of said mixture being iron and trace residuals, adding to said molten mixture pellets comprised of tellurium and bismuth, said pellets having a density greater than that of the base mixture and being added in an amount sufficient to provide between 0.0009% and 0.003% and between 0.0009% and 0.009% of tellurium and bismuth, respectively, thereby forming a mixture of white iron composition wherein substantially all of said carbon is combined as iron carbide and wherein said white iron consists of iron carbide and pearlite, malleabilizing said white iron castings to effect graphitization of said carbides and transformation of said pearlite into ferrite thereby providing a structure of temper carbon nodules distributed through a mixture of ferrite, said castings having a nodule count of between 80 to 200 temper carbon nodules per square millimeter, and maintaining said castings in an inert atmosphere during malleabilization to prevent decarburization thereof.

2. The method as set forth in claim 1 wherein said carbon is present in the range of between 2.5% and 2.6%, said silicon being present in the range of between 1.6% and 1.7%, and said tellurium being present in an amount between 0.0015 and 0.0025%.

3. The method as set forth in claim 1 wherein the carbon equivalent is between 2.99 and 3.5.

4. The method as set forth in claim 1 wherein said white iron castings are malleabilized by heat treatment at between 1200° F. to 1800° F. in 12 to 24 hours.

5. The method as set forth in claim 1 wherein said pellets comprise tellurium and bismuth as the essential ingredients, the pellets comprising a predominant amount of bismuth.

6. The method as set forth in claim 5 wherein said pellets comprise betwen 5 to 60 grams of bismuth and 4 grams of tellurium.

7. The method as set forth in claim 1 wherein silicon is present in the range of 1.7% to 2.35%.

8. The method as set forth in claim 1 wherein said pellets are added as ladle additions.

9. A malleable iron comprising as the essential ingredients between 2.4% and 3% carbon, between 1.5% and 2.35% silicon, not more than 0.15 phosphorus, between 0.0009% and 0.003% tellurium, between 0.0009% and 0.009% bismuth, and the balance being iron and trace residuals, said malleable iron having a microstructure consisting of temper carbon nodules distributed through a ferrite matrix, and said nodules being present in an amount between 80 and 200 temper nodules per square millimeter.

References Cited

UNITED STATES PATENTS

| | | | |
|---|---|---|---|
| 2,331,886 | 10/1943 | Boegehold | 148—3 |
| 2,370,225 | 2/1945 | Boegehold | 148—3 |
| 3,005,736 | 10/1961 | Peras | 148—35 |
| 3,311,469 | 3/1967 | Loper et al. | 75—130 |

OSCAR R. VERTIZ, Primary Examiner

G. O. PETERS, Assistant Examiner

U.S. Cl. X.R.

75—123; 148—138, 139